(12) United States Patent
Roy et al.

(10) Patent No.: US 11,507,966 B2
(45) Date of Patent: Nov. 22, 2022

(54) MULTI-REGION DOCUMENT REVISION MODEL WITH CORRECTION FACTOR

(71) Applicant: Dell Products L.P., Round Rock, TX (US)

(72) Inventors: Mainak Roy, Kolkata (IN); Chitrak Gupta, Bangalore (IN); Rathi Babu, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 152 days.

(21) Appl. No.: 16/270,185

(22) Filed: Feb. 7, 2019

(65) Prior Publication Data

US 2020/0258106 A1 Aug. 13, 2020

(51) Int. Cl.
*G06Q 30/02* (2012.01)
*G06F 40/40* (2020.01)

(52) U.S. Cl.
CPC ......... *G06Q 30/0205* (2013.01); *G06F 40/40* (2020.01)

(58) Field of Classification Search
CPC ............................ G06Q 30/0205; G06F 40/40
USPC ........................................................ 705/7.34
See application file for complete search history.

(56) References Cited

U.S. PATENT DOCUMENTS 8,566,710 B2  10/2013  Travieso et al.
9,792,377 B2*  10/2017  Hao .................. G06Q 30/0205
2001/0041996 A1*  11/2001  Eder ....................... G06Q 10/06
  705/7.29
2002/0169708 A1*  11/2002  Chittenden ............ G06Q 40/04
  705/37
2004/0103075 A1*  5/2004  Kim ...................... G06F 16/951

(Continued)

FOREIGN PATENT DOCUMENTS

EP  2808790 B1  4/2021

OTHER PUBLICATIONS

Wijnants, Maarten & Blazejczak, Adam & Quax, Peter & Lamotte, Wim. (2014). TweetPos: A Tool to Study the Geographic Evolution of Twitter Topics. WEBIST 2014—Proceedings of the 10th International Conference on Web Information Systems and Technologies. 1. 257-266.*

(Continued)

*Primary Examiner* — Timothy Padot
(74) *Attorney, Agent, or Firm* — Terrile, Cannatti & Chambers, LLP; Emmanuel A. Rivera

(57) ABSTRACT

A system, method, and computer-readable medium are disclosed identification of demand for documentation for particular languages and facilitate modification of documentation to the particular languages based upon demand. A multi-region document revision model which includes a correction factor, provides for monitoring of how information is being consumed in different regions via different platforms. Identification is performed for demand for documentation for particular languages and facilitates modification of documentation to the particular languages based upon demand. Various internal and external social media platforms are searched to provide a data set which can then be used to customize a language set for a particular language. In certain implementations the documentation includes respective semantic files which are used by a /business unit to validate and update the documentation.

20 Claims, 5 Drawing Sheets

(56) References Cited

U.S. PATENT DOCUMENTS

| | | | |
|---|---|---|---|
| 2007/0067728 A1* | 3/2007 | Lo | G06Q 10/10 |
| | | | 715/234 |
| 2008/0195462 A1* | 8/2008 | Magdon-Ismail | |
| | | | G06Q 30/0204 |
| | | | 705/7.33 |
| 2010/0023311 A1* | 1/2010 | Subrahmanian | G06F 16/345 |
| | | | 707/E17.109 |
| 2011/0191417 A1 | 8/2011 | Rathod | |
| 2013/0231974 A1* | 9/2013 | Harris | G06Q 30/0201 |
| | | | 705/7.29 |
| 2013/0275259 A1* | 10/2013 | Chidambaram | G06Q 30/0269 |
| | | | 705/26.7 |
| 2013/0325877 A1* | 12/2013 | Niazi | G06Q 30/0203 |
| | | | 707/736 |
| 2013/0332460 A1* | 12/2013 | Pappas | G06F 16/951 |
| | | | 707/740 |
| 2014/0279606 A1* | 9/2014 | Storm | G06Q 10/0637 |
| | | | 705/317 |
| 2015/0112753 A1* | 4/2015 | Suvarna | G06Q 50/01 |
| | | | 705/7.29 |
| 2015/0269278 A1 | 9/2015 | Bhattacharyya et al. | |
| 2015/0302474 A1* | 10/2015 | Lampert | G06Q 30/0601 |
| | | | 705/14.53 |
| 2015/0310462 A1* | 10/2015 | Garcia | G06Q 30/0203 |
| | | | 705/7.32 |
| 2016/0026920 A1* | 1/2016 | Sullivan | G06F 16/48 |
| | | | 706/11 |
| 2016/0292727 A1* | 10/2016 | Krishnamurthy | G06Q 30/0255 |
| 2017/0103130 A1* | 4/2017 | Roy | G06Q 50/01 |
| 2017/0123634 A1* | 5/2017 | Pai | G06Q 10/0633 |
| 2017/0249683 A1* | 8/2017 | Yadav | G06F 16/2455 |
| 2019/0228088 A1* | 7/2019 | Ammanamanchi | |
| | | | G06Q 30/0205 |
| 2020/0387914 A1 | 12/2020 | Rathrod | |

OTHER PUBLICATIONS

Understanding U.S. regional linguistic variation with Twitter data analysis. Yuan Huang; Diansheng Guo; Kasakoff, Alice; Grieve, Jack. Computers, Environment and Urban Systems 59 : 244-55. Elsevier B.V. (Sep. 2016).*

Google, Cloud Natural Language API, https://cloud.google.com/natural-language/docs/, downloaded Dec. 11, 2019.

Fensel et al., Semantic Web Services, https://www.sti-innsbruck.at/sites/default/files/courses/fileadmin/documents/WS201718/ Semantic%20Web/12_SW-Semantic_Web_Services-handouts.pdf, Semantic Technology Institute (STI) Innsbruck, 2018.

* cited by examiner

MULTI-REGION DOCUMENT REVISION MODEL WITH CORRECTION FACTOR

BACKGROUND OF THE INVENTION

Field of the Invention

The present invention relates to the management of information handling systems. More specifically, embodiments of the invention provide a system, method, and computer-readable medium for identification of demand for documentation for particular languages and facilitate modification of documentation to the particular languages based upon demand.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The widespread availability of such information handling systems has been instrumental in the adoption of social media into the mainstream of everyday life. Social media commonly refers to the use of web-based technologies for the creation and exchange of user-generated content for social interaction. An increasingly popular use of social media is to provide a channel for customer feedback and support. One aspect of customer support is understanding or knowing product related issues which can be disseminated through documents/files posted on various social media environments and platforms, including business controlled sites, such as support or technical sites.

As businesses become more global, supporting customers in different countries, communicating in different languages, there are challenges to businesses to provide the ability for customers to generate documents and search capabilities for content in a global environment. Furthermore, because customers are localized to a country/language, there is a desire to provide customized content to regional customers. Since customers are regional, business have a challenge to use the regional data from customers to perform analytical studies and provide specific business units to use synthesized data to perform analytical business studies to improve customer service and increase profitability.

Understandably, customers prefer to use their native language, such as in browsing the Internet, visiting social media and other sites, etc. To attract and reach a greater audience, it is desirable for businesses to provide the use of native/regional languages to customers. However, there are challenges in periodically tracking multilingual metadata where such metadata is received from different regions/countries via different platforms (e.g., social media, business support site, business operated social platforms, etc.). Additional challenges include using updated data for analytical (business analytics) studies, and making decisions for a specific business based on such metadata.

SUMMARY OF THE INVENTION

A system, method, and computer-readable medium are disclosed for identification of demand for documentation for particular languages and facilitate modification of documentation to the particular languages based upon demand.

In various embodiments, multi-region document management system monitors consumption of information specific to a region, country and/or language. The information can be related to a product and/or service. The information can be files or documents related to such a product and/or service. Demand based on region, country and/or language is determined. Business analytics performed on the information can be performed to determine updates or changes to information and to determine variables that can be adjusted/changed to support objectives of particular business units.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for improved identification of demand for documentation for particular languages and facilitate modification of documentation to the particular languages based upon demand. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
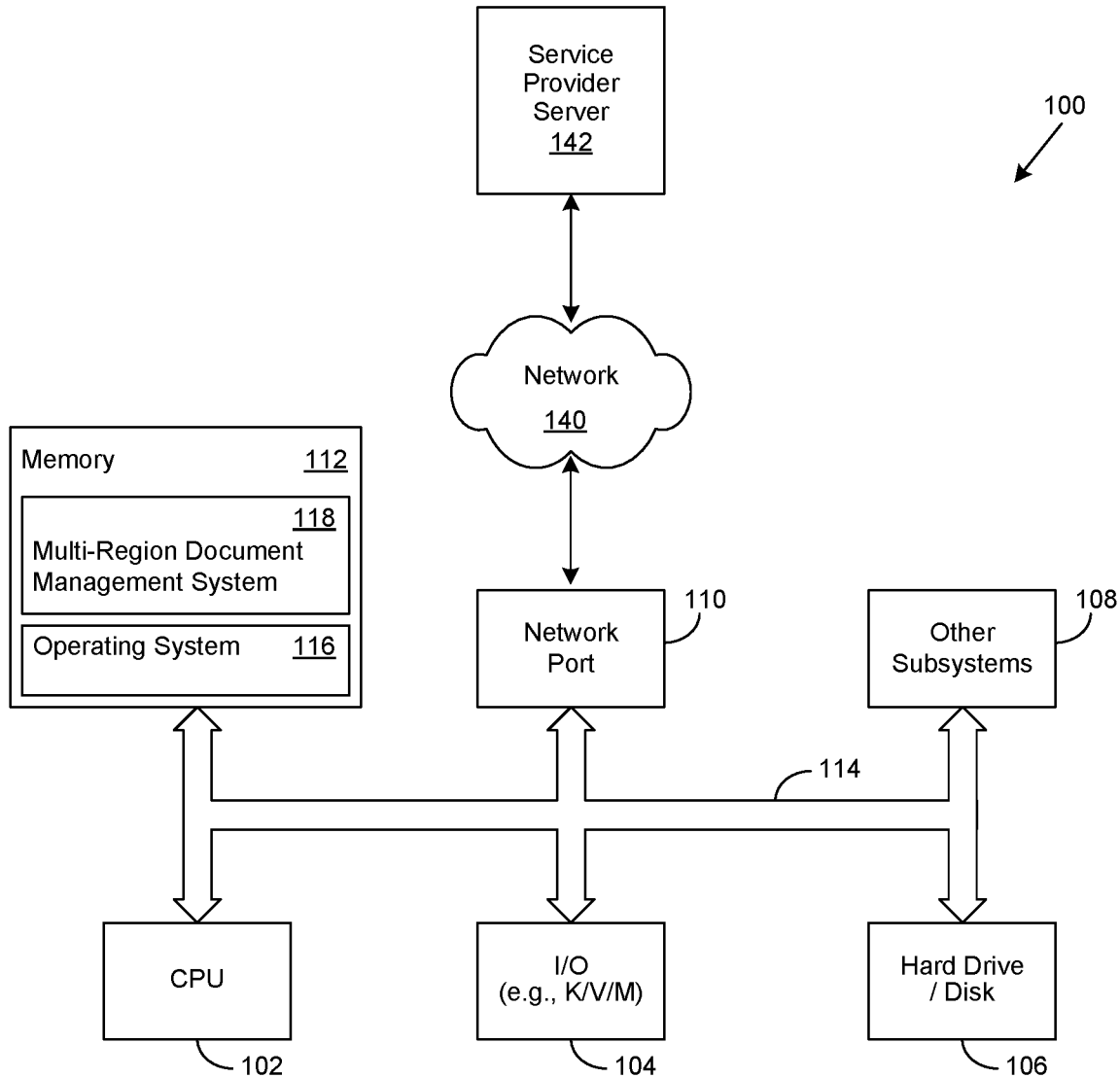
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a multi-region document management system 118. In one embodiment, the information handling system 100 is able to download the multi-region document management system 118 from the service provider server 142. In another embodiment, the unattended user query management system 118 is provided as a service from the service provider server 142.

Figure 2:
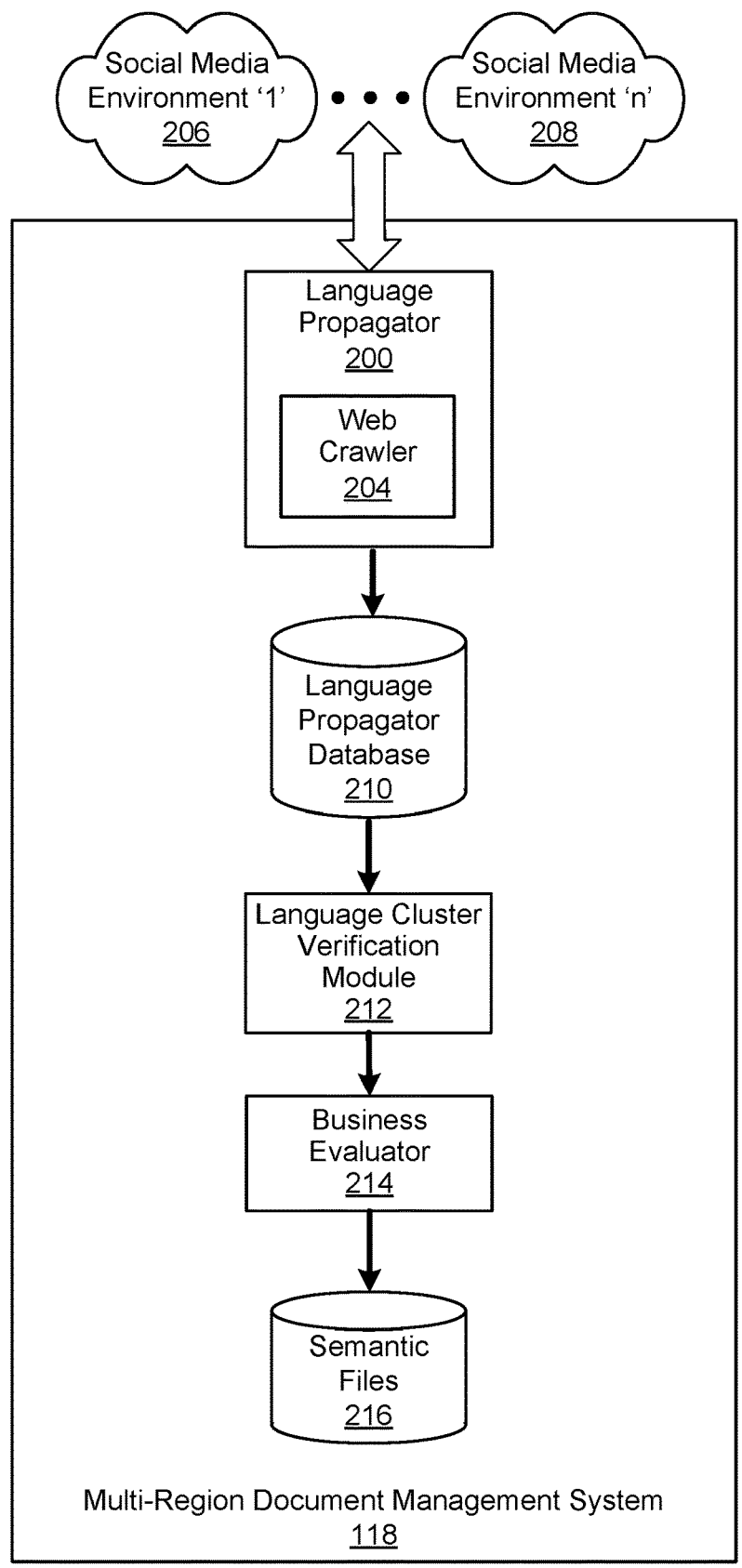
FIG. 2 is a simplified block diagram of a multi-region document management system.

FIG. 2 is a simplified block diagram of a multi-region document management system implemented in accordance with an embodiment of the invention. In this embodiment, the multi-region document management system 118 includes a language propagator module 200 that includes a web crawler 202. In certain implementations, the web crawler 202 is configured to crawl/search language files/documents that are posted on various sites and platforms as represented by social media environment '1' 206 to social media environment 'n' 208, which can include business support sites, business technical centers, social media platforms external to the business, social media platforms internal to the business, etc. In certain implementations, the language that is used for the files/documents can be identified using a language application program interface (API).

In certain implementations, the language propagator module 200 identifies product specific key phrases, hashtags (#tags), product identifiers, and other features that create unique identities for products provided/supported by the business. The language propagator module 200 initiates the web crawler 202, which identifies and monitors sources (i.e., social media environment '1' 206 to social media environment 'n' 208) of different language or semantic files/documents as related to particular products. In certain implementations, the language propagator module 200 enters such product specific language or semantic files/documents into a language propagator database 210. In certain implementations, the language propagator module 200 is updated periodically. The language propagator database 210 stores the product specific files/documents.

In certain implementations, using the data or product specific language or semantic files/documents stored in the language propagator database 210, a language cluster verification module 212 is used to identify relationships of the data as to languages, region, and country. For example, the language cluster verification module 212 can be used to identify region, and different languages that are used by a specific region/country. Furthermore, the data can be segregated as to different product or business units. Other information that can be identified includes the number of times related information is downloaded or viewed from a specific site and other relevant data. In certain implementations, an analytics application, such as Google® Analytics or Omniture® Site Catalyst can be implemented to identify such data sets. The data sets can be verified against predefined product identifiers/values stored in the language propagator module 200.

In certain implementations, verified data sets are used by a business evaluator module 214. Business units of a business can have different requirements when determining language sets for the particular business activities. Parameters can vary for the particular current and upcoming products, supported by the business units. In certain implementations, the business evaluator module 214 generates intermediate language or semantic files/documents for particular business units and product lines supported by the particular business units. Such language or semantic files/documents can include more granular/detailed data respective to a particular business unit. Since language or semantic files/documents are dynamic or continuously changing in nature, the language or semantic files/documents are updated by the language propagator module 200 as the language propagator module 200 fetches or finds a new incident for a product, whether that language for the file/document is a current language or new language. The new incident can be across the different sites and platforms social media environment '1' 206 to social media environment 'n' 208.

In certain implementations, the language or semantic files/documents can be stored in a semantics files database 216. In certain instances, there can be multiple fragments of data, or incomplete data, which are product driven under a language or semantic file/document. In certain cases, the fragments of data are updated over a period of time. Therefore, for certain implementations, whenever there is a new release for a particular product, the language propagator module 200 and language cluster verification module 212 can collect and upgrade the related fragments. Fragments of data can include information for different language sets, which combines data for different business unit driven variables.

Figure 3:
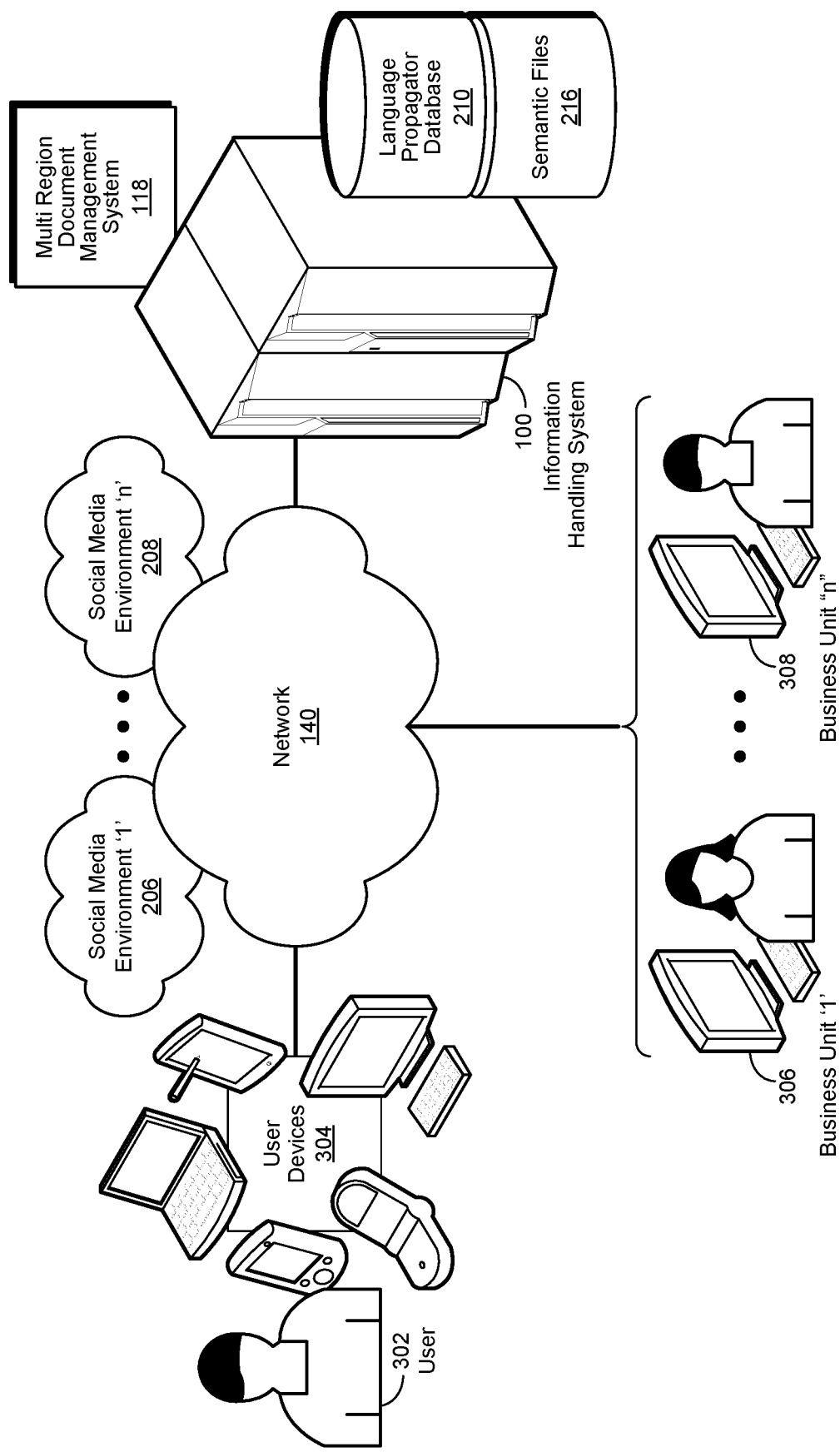
FIG. 3 is a simplified block diagram of a multi-region document management system implemented to manage multi-regional documents.

FIG. 3 is a simplified block diagram of a multi-region document management system in accordance with an embodiment of the invention to manage language or semantic files/documents. In various embodiments, a user 302 may post a document/file to one or more of social media environment '1' 206 to social media environment 'n' 208. The document/file can be language specific to the user 302, and particular to a region or country that the user 302 resides. Such a document/file can include product specific inquiries, comments, reports, repair requests, etc.

As used herein, a user device 304 refers to an information handling system such as a personal computer, a laptop computer, a tablet computer, a personal digital assistant (PDA), a smart phone, a mobile telephone, or other device that is capable of communicating and processing data. In various embodiments, the user device 304 is used to exchange information between the user 302 and one or more of social media environment '1' 206 to social media environment 'n' 208 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In this embodiment, multi-region document management system 118 is implemented on information handling system 100 to respectively monitor interactions conducted within a target social media environment '1' 206 to social media environment 'n' 208 that may provide a document/file. In various embodiments, the information handling system 100 may include repositories/databases language propagator database 210 and semantics files database 216. In these various embodiments, the network 140 is used by the multi-region document management system 118 to monitor the social media environment '1' 206 to social media environment 'n' 208 language or semantic files/documents.

The multi-region document management system 118 then determines which business unit or units, such as a business units '1' 306 through 'n' 308, will be responsible or have interest as to particular data sets of language or semantic files/documents. In certain instances, the business units '1' 306 through 'n' 308 are business evaluators, which use the data sets of language or semantic files/documents, for business analytics. Examples of such analytics include periodically monitoring how information is consumed in different native languages/country and regions via different platforms; customization of a language set based on a sustainable data set; determining new regions and markets based on use of particular languages; propagating information in different languages to reach more customers; reducing the number of support calls, etc.

Figure 4:
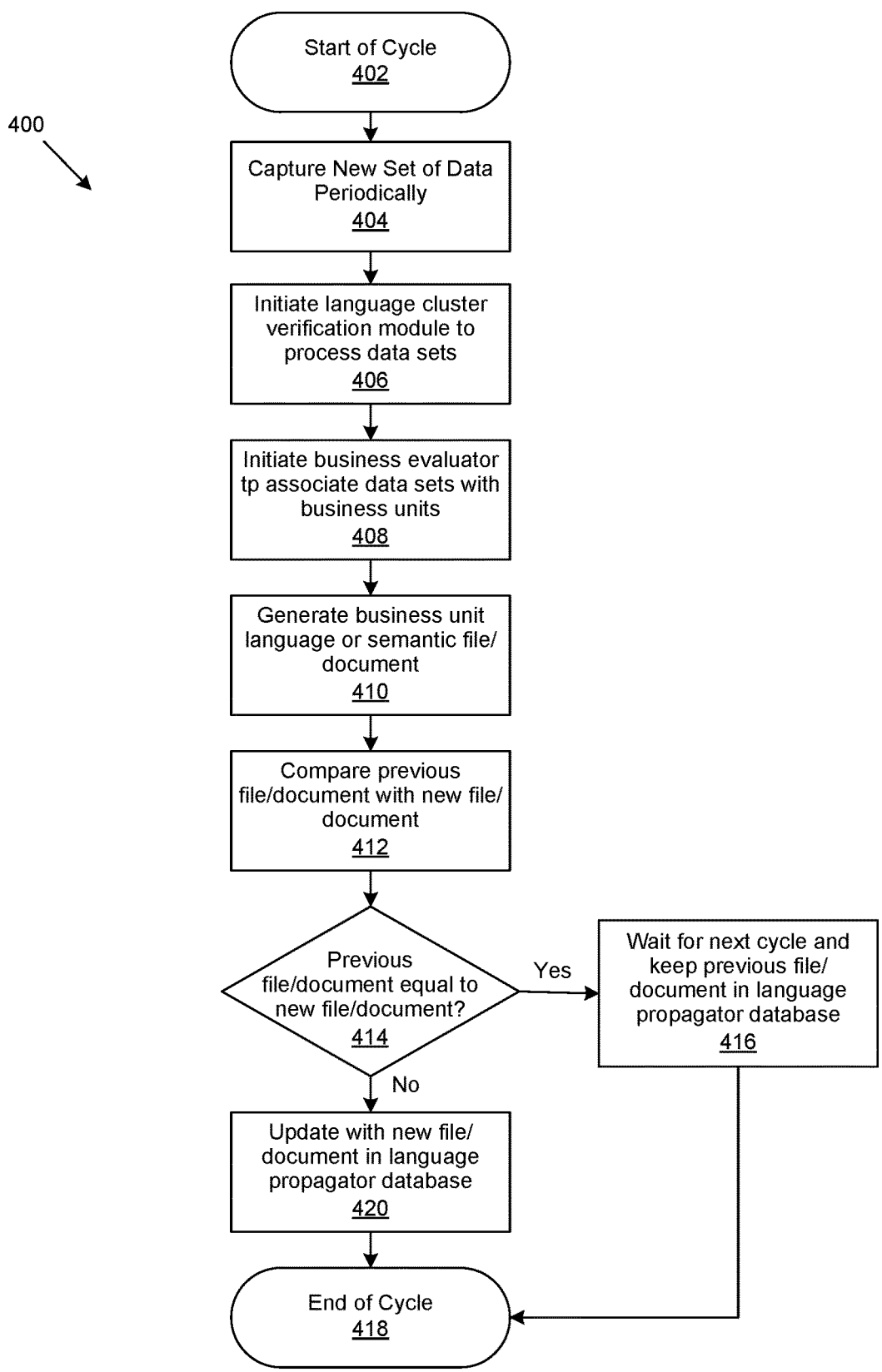
FIG. 4 is a generalized flowchart regarding updating language or semantic files/documents.

FIG. 4 is a generalized flowchart 400 regarding updating such language or semantic files/documents. As discussed above, language or semantic files/documents are dynamic or continuously changing in nature. In certain implementations, a predefined/predetermined cycle or period is used as to when a searching for language or semantic files/documents is performed. In other implementations, searching for language or semantic files/documents is continuous or does not have a set cycle. As discussed, the language or semantic files/documents can be product related. Also in certain cases, language or semantic files/documents can be related to services that are provided. As also discussed, data sets of language or semantic files/documents can be incomplete or fragmented. Furthermore, as discussed there are instances of product updates which affect related language or semantic files/documents.

For this implementation, at step 402, a cycle is started. As discussed, for other implementations, flowchart 400 can be performed periodically or whenever it is determined that an update to language or semantic files/documents are available. At step 404, new data sets of language or semantic files/documents are captured. In certain implementations, the language propagator module 20 initiates the web crawler 202 to perform such a capture. At step 406, the data sets are processed. In certain implementations, the processing is performed by the language cluster verification module 212. At step 408, the data sets are associated with particular business units. In certain implementations, the business evaluator module 214 performs the association. At step 410, particular language or semantic files/documents are generated for particular business units. At step 412, particular business unit language or semantic files/documents are compared as to previous versions and recent or new versions. At block 414, a decision is performed if the previous version of the language or semantic file/document is the same as the recent or new version. If the decision is "Yes" at block 414, then at step 416, the previous language or semantic file/document is kept. At step 418 the cycle ends. If the decision is "No" at block 414, then at step 420, the updated language or semantic file/document is kept. At step 418 the cycle ends. In certain implementations, the language or semantic file/document is stored in the language propagator database 210.

As discussed above, the business units '1' 306 through 'n' 308 can be business evaluators, and through the multi-region document management system 118 which allows for the modification or revision of documents with correction factors based on a particular analysis a business unit desires to perform. In particular, such a document revision model is multi-regional and accounts for region/country language.

Examples of business analysis (analytics studies) that can be performed using such a multi-region document revision model with correction factors include, determining how products perform in a various regions/countries, determining how local user are accepting such products based on usage pattern of the local user language, determining the different requirements for different geographic regions, determining variations of global sentiments regarding the products, etc.

In certain implementations, a business unit of business units '1' 306 through 'n' 308 receives a language or semantic file/document for analysis and can apply business driven algorithms to the entire data set. The same business driven algorithms can be applied to fragments of such a language or semantic file/document, such as if the requirement is to a particular version of a product. Different businesses or business units can have different requirements, such as commercial requirements. For analytics studies, customized reports can be generated based on the needs/requirements of a business or business unit.

A business or business unit can desire to observe the trend of certain variables over a period of time to determine anomalies or trends that impact the business or business unit. The variables can be business unit specific. Such anomalies or trends can be negative or positive. Such a business analysis can be also be a projection. In certain implementations, threshold parameters can be set for the variables, which are set/determined by the business or business units. A variable can be set, while other variables chosen/changed by the business or business unit. For example, to provide a comparison as to how certain variables can affect revenue, the variable "revenue" may be set, while other variables, such as "matched speaking language", "number of downloads (of file/document)", "number of views (of file/document)", etc. In certain implementations, the business evaluator 214 performs such an analysis.

A variable which is important for a particular business unit may not have significant influence for the other business units. Therefore, business units can define and adjust variables based on their needs.

In certain implementations, the variables can have threshold or predefined limit/value. The threshold or predefined limit/value can be set by the business or business. Factors in setting the threshold or predefined limit/value include product maturity. The variables, also known as parameters, can have a weighted average, or correction factor. For example, the following can be used to determine weighted averages for variables.

The weighted average formula is used to calculate the average value of a particular set of numbers with different levels of relevance. The relevance of each number is called its weight. The weights should be represented as a percentage of the total relevancy. Therefore, all weights should be equal to 100%, or 1.

Weighted $AVGx = w1x1 + w2X2 + \ldots wnXn$

Weighted AVGx represents a specific result for a particular business or business unit
w=related weighted %
x=value for specific business unit Each variable is treated a as a separate entity and represented by w. The related weighted average can be controlled by the business or business entity, where "w1" represents the revenue driven data which remains fixed for a business unit, and "x" defines the actual value for that variable on a given instance.

Trends can be determined for specific variables. Each variable has its own threshold value "v." For example, set "n" to define the time period in months. Therefore, a determination is made to see how a variable performs. If the trend is sustained for a determined period of time, the business unit can accept the variable value and can use such values to plan for business activities, such as budgets, based on the specific set of variables, where the set of variables present different language variables/parameters for global, local, and international optimization.

The following formula may be used to plot different variables against time.

$$\int_1^n v1 = \frac{dy}{dz}(\alpha)$$

Where y=variation for a particular month, z=avg variation for the same variable across the entire timeline, and α=permitted correction factor for a variable, the value can be defined by the business for every individual variable.

As discussed, the variable "revenue" is set. Reports can be generated based on a revenue driven model, while certain selection criteria that can be implemented, such as number of users for different languages, the top number (e.g. top 10) languages that are used, and other criteria. Reports can be generated based on the business driven variables or parameters. As discussed, the variable "revenue" is selected to determine how a business or business unit is doing. Other variables can be changed to see the affect on "revenue," where other variables can include "matched speaking language," "number of download for product related information," "number of views or interactions on the content," etc. The model further allows, businesses and business units to create their own variables. Business or business units are provided the ability to customize specific variables based on business targets and to define related weighted variables. Business reports can show how current data sets deviate from a weighted average and impacts on businesses.

Figure 5:
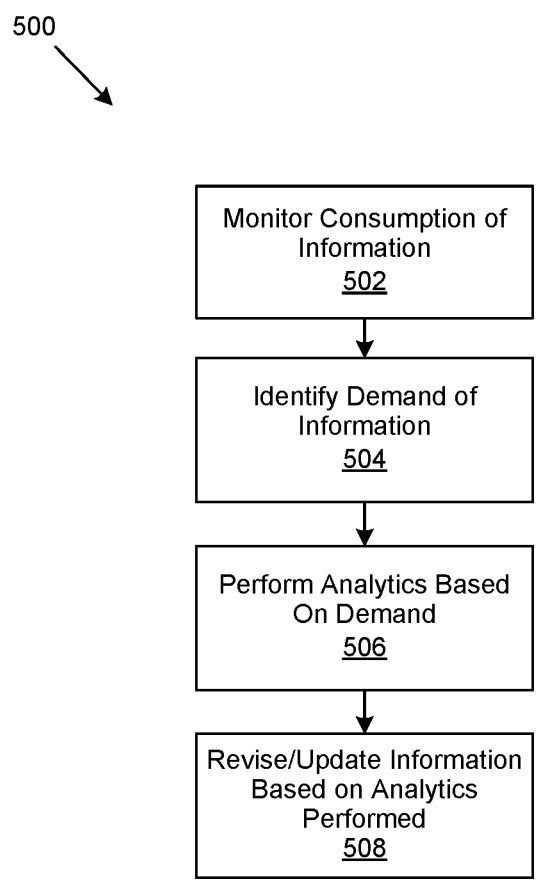
FIG. 5 is a generalized flowchart regarding implementing a multi-region document management system.

FIG. 5 is a generalized flowchart of the performance of operations implemented in accordance with an embodiment of the invention to implement a multi-region document management system. At step 502, monitoring of consumption of information is performed. The monitoring is directed to files/documents that are specific to a particular countries/regions and languages that are used. The information or data is identified as to language, region, country. The information or data can be furthered identified by specific products or services provided by a business or business unit. At block 504, demand for the information is identified. The identified demand can be specific to region, country and/or languages. The demand can include requests to a business/business units as to particular products or services. At block 506, analytics are performed based on the demand. The analytics can include demand for products or services in particular regions or countries. Demand can include acceptance in the particular regions or countries. Analytics can also include projections based on variables that affect business outcomes such as revenue. At block 508, revisions to the information is performed. Files/documents can be revised per the analytics that are performed and the results that are determined.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for improved identification of demand for documentation, comprising:
   monitoring by a web crawler of a language propagator module, consumption of information as to a particular product specific to a region, country and/or language of various sites and platforms of social media sites representing business support sites, business technical centers, social media platforms external to a business, and social media platforms internal to the business, wherein the information includes files and documents as to the particular product in a particular language that is identified by the language propagator module to create semantic files and documents;
   identifying by the language propagator module through an application program interface (API), features unique to the particular product that include product specific key phrases, hashtags (#tags), and product identifiers that create unique identities for products provided or supported by the business;

identifying by the web crawler, demand of the information by users specific to the region, country and/or language as identified by the language propagator module;

performing business analytics by a multi-region document revision system on the information, wherein the business analytics are defined by certain variables related to the demand, anomalies, or trends affecting the business based on variables that include revenue, language, and number of views of documents;

revising the information by the multi-region document revision system based on the business analytics; and periodically updating the semantic files and documents when the web crawler is initiated by the language propagator module.

2. The method of claim 1, wherein the information comprises data sets of language files or documents.

3. The method of claim 1, wherein the monitoring is performed on one or more sites or platforms.

4. The method of claim 1, wherein the performing business analytics comprises one or more of the following:

determining how products perform in a various regions or countries;

determining how local user are accepting such products based on usage pattern of local user language;

determining different requirements for different geographic regions;

determining variations of global sentiments regarding a product or service.

5. The method of claim 1, wherein the performing business analytics is specific to one or more business units.

6. The method of claim 1, wherein the variables include a fixed value for one variable and adjustable variables for other variables.

7. The method of claim 6, wherein the values of the other variables are given a weighted average.

8. The method of claim 1 further comprising updating the information periodically.

9. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations for improved management of unattended user queries and comprising instructions executable by the processor and configured for:

monitoring by a web crawler of a language propagator module, consumption of information as to a particular product specific to a region, country and/or language of various sites and platforms of social media sites representing business support sites, business technical centers, social media platforms external to a business, and social media platforms internal to the business, wherein the information includes files and documents as to the particular product in a particular language that is identified by the language propagator module to create semantic files and documents;

identifying by the language propagator module through an application program interface (API), features unique to the particular product that include product specific key phrases, hashtags (#tags), and product identifiers, that create unique identities for products provided or supported by the business;

identifying by the web crawler, demand of the information by users specific to the region, country and/or language as identified by the language propagator module;

performing business analytics by a multi-region document revision system on the information, wherein the business analytics are defined by certain variables related to the demand, anomalies, or trends affecting the business based on variables that include revenue, language, and number of views of documents;

revising the information by the multi-region document revision system based on the business analytics; and periodically updating the semantic files and documents when the web crawler is initiated by the language propagator module.

10. The system of claim 9, wherein the monitoring is performed periodically.

11. The system of claim 9, wherein the identifying demand is specific to a region, country and/or language.

12. The system of claim 9, wherein the data sets are fragmented which includes information for different languages sets that combine data for different business unit drive variables.

13. The system of claim 9, wherein the data sets are specific to products or services.

14. The system of claim 9, wherein performing business analytics is specific to a business unit or units.

15. The system of claim 9, wherein revising comprises providing updated information to users.

16. A non-transitory, computer-readable storage medium embodying computer program code, the computer program code comprising computer executable instructions configured for:

monitoring by a web crawler of a language propagator module, consumption of information as to a particular product specific to a region, country and/or language of various sites and platforms of social media sites representing business support sites, business technical centers, social media platforms external to a business, and social media platforms internal to the business, wherein the information includes files and documents as to the particular product in a particular language that is identified by the language propagator module to create semantic files and documents;

identifying by the language propagator module through an application program interface (API), features unique to the particular product that include product specific key phrases, hashtags (#tags), and product identifiers, that create unique identities for products provided or supported by the business;

identifying by the web crawler, demand of the information by users specific to the region, country and/or language as identified by the language propagator module;

performing business analytics by a multi-region document revision system on the information, wherein the business analytics are defined by certain variables related to the demand, anomalies, or trends affecting the business based on variables that include revenue, language, and number of views of documents;

revising the information by the multi-region document revision system based on the business analytics; and periodically updating the semantic files and documents when the web crawler is initiated by the language propagator module.

17. The non-transitory, computer-readable storage medium of claim 16, wherein the monitoring is performed periodically to search for updated files/documents.

18. The non-transitory, computer-readable storage medium of claim 16, wherein the performing business analytics includes setting a value to one variable and adjusting values of other variables that are given a weighted average.

19. The non-transitory, computer-readable storage medium of claim 16, wherein the performing business analytics determines projected increases business revenue.

20. The non-transitory, computer-readable storage medium of claim 16, wherein the revising comprising providing updated files/documents to users.

\* \* \* \* \*